US006859024B2

(12) United States Patent
Molnar et al.

(10) Patent No.: US 6,859,024 B2
(45) Date of Patent: Feb. 22, 2005

(54) DEVICE FOR DETECTING AN ELECTRICALLY CONDUCTIVE PARTICLE

(75) Inventors: Stephen Michael Molnar, Ashburton (AU); David Allan Nolte, Clayton (AU)

(73) Assignee: Telstra New Wave Pty Ltd., Melbourne (AU)

(*) Notice: Subject to any disclaimer, the term of this patent is extended or adjusted under 35 U.S.C. 154(b) by 0 days.

(21) Appl. No.: 10/145,620

(22) Filed: May 8, 2002

(65) Prior Publication Data

US 2002/0195956 A1 Dec. 26, 2002

Related U.S. Application Data

(60) Provisional application No. 60/289,648, filed on May 8, 2001.

(51) Int. Cl.[7] ................................................ G01N 15/02

(52) U.S. Cl. ...................................... 324/71.4; 324/464

(58) Field of Search ................................ 324/71.4, 464

(56) References Cited

U.S. PATENT DOCUMENTS

| | | | | |
|---|---|---|---|---|
| 3,821,644 A | | 6/1974 | Gohde et al. | 324/71 CP |
| 3,928,837 A | * | 12/1975 | Esper et al. | 338/32 R |
| 4,213,087 A | * | 7/1980 | English et al. | 324/719 |
| 4,312,180 A | | 1/1982 | Reif et al. | 60/39.09 R |
| 5,179,346 A | | 1/1993 | McGee et al. | 324/693 |
| 5,388,448 A | | 2/1995 | Showalter et al. | 73/61.71 |
| 6,043,639 A | | 3/2000 | Arrowsmith et al. | 324/71.4 |

FOREIGN PATENT DOCUMENTS

| | | | |
|---|---|---|---|
| CA | 2222835 | * | 5/1999 |

OTHER PUBLICATIONS

Patent Abstracts of Japan; Publ. No. 04–314345; Publ. Date May 11, 1992; Appl. No. 03–079417; Applicant: NEC Corp; Inventor: Tajima Fumihiko; Title: Whisker Detector.

* cited by examiner

*Primary Examiner*—David Vu
(74) *Attorney, Agent, or Firm*—Dorsey & Whitney LLP

(57) ABSTRACT

A device (10) for detecting the presence of an airborne, electrically conductive particle, the device including spaced conductors (24,26) and a circuit (12) for detecting when the electrically conductive particle forms a conducting path between the spaced conductors (24,26). The conductors (24,26) are provided in a grid (14) of alternate elongate conductors, and the circuit (12) applies a voltage to one set (24) of conductors sufficient to detect and destroy the particle when it creates a conductive path to the alternate set (26) of conductors.

31 Claims, 5 Drawing Sheets

DEVICE FOR DETECTING AN ELECTRICALLY CONDUCTIVE PARTICLE

This application claims the benefit of provisional Application No. 60/289,648, filed May 8, 2001.

FIELD OF THE INVENTION

The present invention relates to a device for detecting an electrically conductive particle.

BACKGROUND OF THE INVENTION

Electrical equipment may not perform correctly if undesirable electrically conducting paths form between circuit elements at different electrical potentials. Installations with low voltage circuitry such as telephone exchanges and computer rooms are particularly vulnerable. Electrically conducting paths may form when airborne, electrically conductive particles settle upon circuit elements. For example, zinc particles or "whiskers" are known to grow on zinc electroplated metalwork used in such installations. If a whisker breaks away from the metalwork, the result is an extremely light, virtually invisible, needle-like and highly electrically conductive, airborne whisker. This whisker may fall upon sensitive electronic circuitry, resulting in equipment failure. This mode of failure is known to occur in many installations, yet can be particularly difficult to diagnose. Failure due to metallic whiskers is an ongoing problem which is extremely costly for providers of data processing and switching equipment. It is desired, therefore, to provide a device for detecting an electrically conductive particle, or at least a useful alternative to existing detection devices.

SUMMARY OF THE INVENTION

In accordance with the present invention, there is provided a device for detecting the presence of an airborne, electrically conductive particle, said device including spaced conductors and a circuit for detecting when said electrically conductive particle forms a conducting path between said spaced conductors.

The present invention also provides a device for detecting an electrically conductive particle present in the air, including:

a detection grid of spaced conductors; and a detection circuit for detecting when said particle electrically connects said conductors.

The present invention also provides a device for detecting an electrically conductive whisker, including:

a sensor of spaced conductors; and a detection circuit for detecting when said whisker electrically connects said conductors.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

Figure 1:
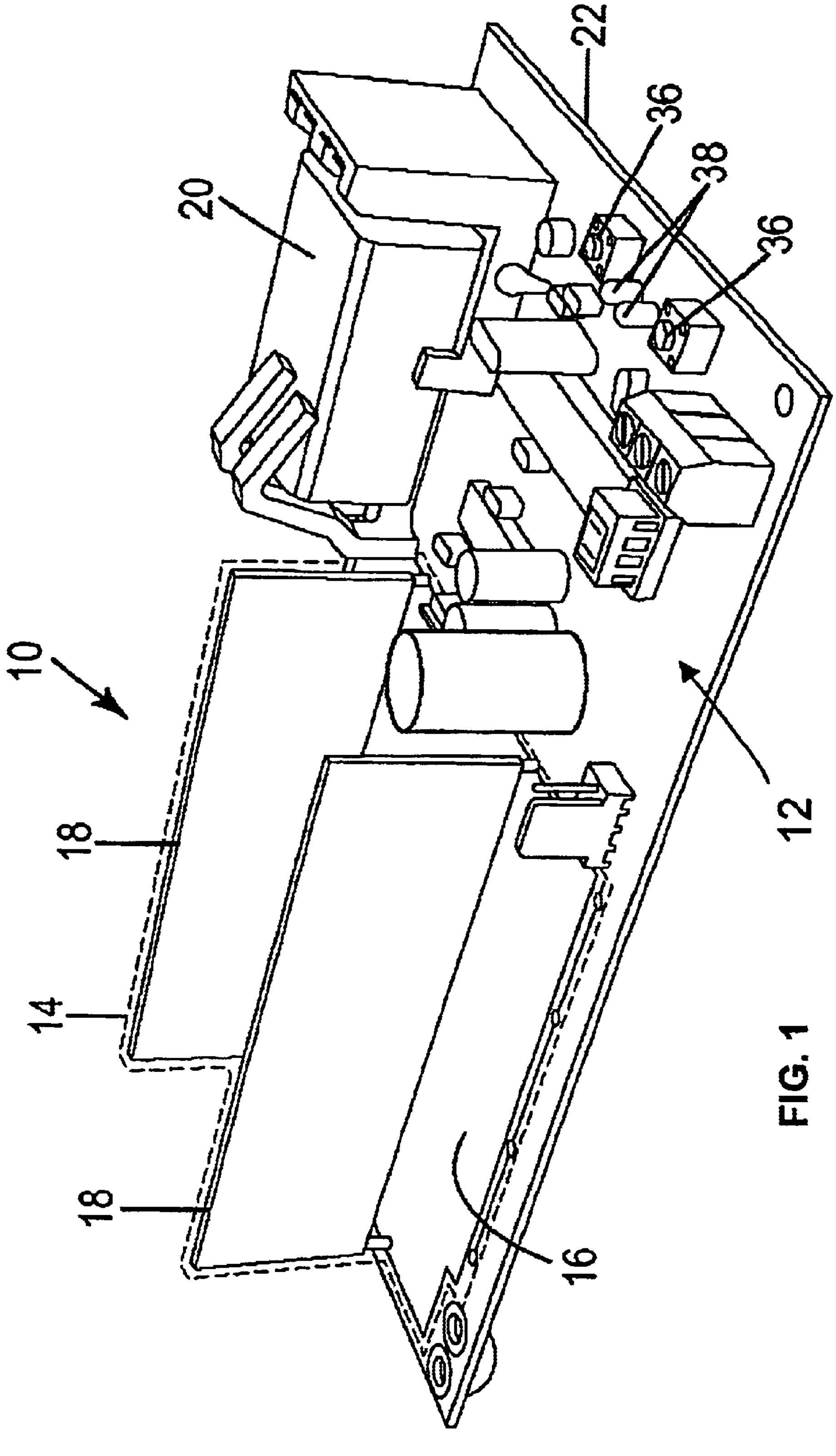
FIG. 1 is a schematic diagram of a preferred embodiment of a particle detector.

A detector 10 of electrically conductive particles, as shown in FIGS. 1 to 4, includes a sensor 14 and a processing circuit 12. The detector 10 detects electrically conductive particles larger than a certain size that contact the sensor 14 and stores the number of detection events in non-volatile memory 40. The detector 10 includes status indicators 38 for providing visual information to a user of the detector 10, such as when a particle is detected, and the number of particles detected by the detector 10. The detector 10 may be used to qualitatively or quantitatively indicate the presence of airborne metallic whiskers in electrical installations prone to failures caused by whiskers from equipment metalwork. Because the detector 10 is small enough to be held in the hand, it may be easily used by maintenance personnel to evaluate whisker counts in several locations within a single installation, for example. The early detection of whiskers allows subsequent equipment failure to be avoided by removing whiskers from an installation, and provides an indication of the likelihood of whiskers as the cause of equipment failure.

The sensor 14 comprises a number of detection grids 16, 18. The detector 10 is built on a standard fiberglass PC board (PCB) 22, and most of the surface of the PCB 22 is occupied by two detection grids 16, one on either side of the PCB 22. The detector also includes two additional detection grids 18, mounted perpendicular to the plane of the PCB 22 to increase the detection probability. The four detection grids 16, 18 are connected in parallel. The PCB has a small rubber foot in each of its four corners for supporting the detector 10.

Figure 2:
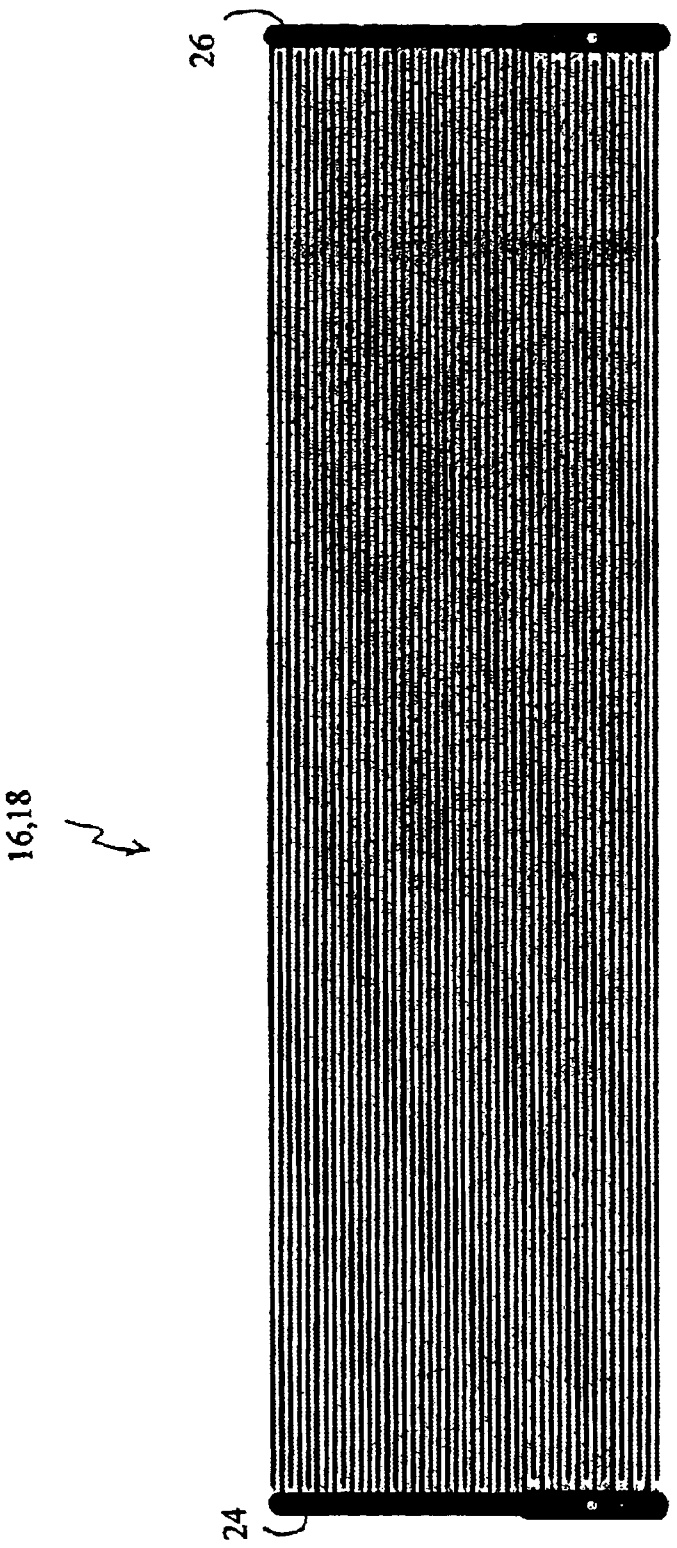
FIG. 2 is a diagram of an electrode structure of the detector.

Each detection grid 16, 18 comprises a pair of electrically conductive, interdigitated tracks or fingers 24, 26, as shown in FIG. 2 for the two mounted detection grids 18. The fingers 24, 26 are supported on fiberglass PC boards, and the outer surfaces of the fingers 24, 26 are coated with gold to ensure good electrical contact with impinging particles. The use of gold plating is significant as it provides good conductivity and does not form an insulating surface oxide layer on the fingers. The PCB material is electrically insulating, so that there is essentially no electrical conductivity between the two fingers 24, 26 unless an electrically conductive particle contacts the two fingers simultaneously, such as when an airborne metallic whisker impinges upon the two fingers 24, 26.

Figure 3:
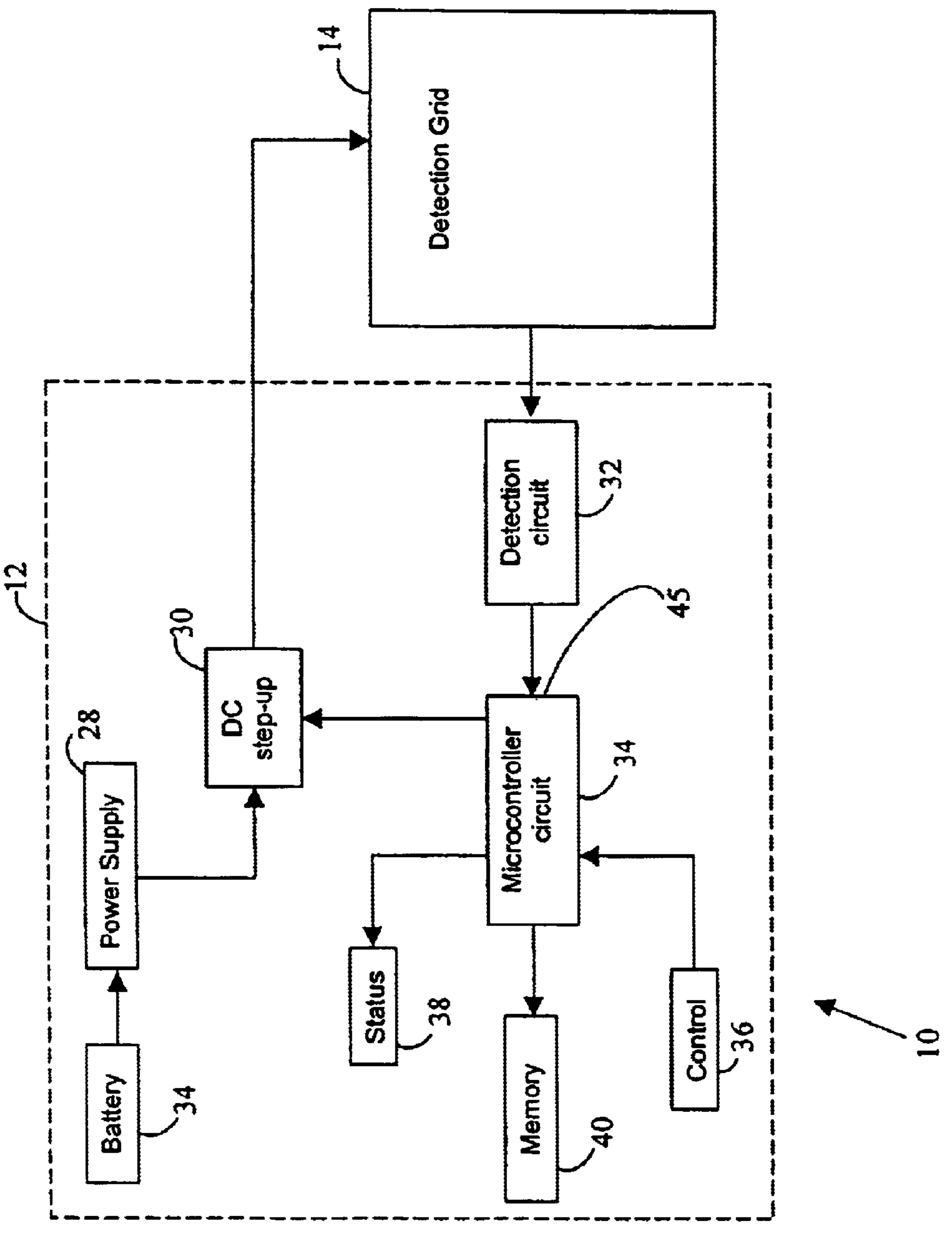
FIG. 3 is a block diagram of the electrical components of the detector.
Figure 4:
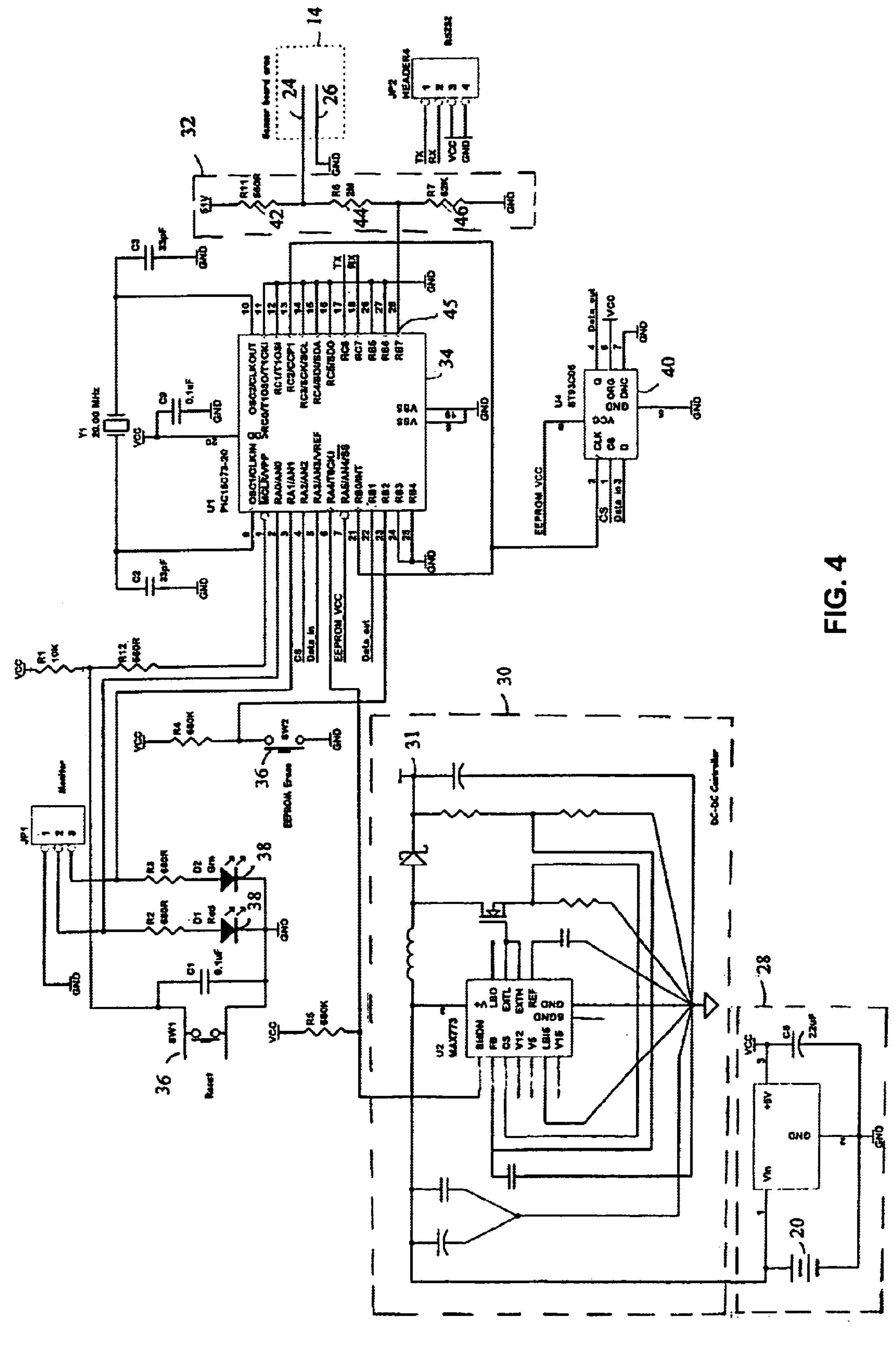
FIG. 4 is a circuit diagram of the electrical components of the detector.

The processing circuit 12, as shown in FIGS. 3 and 4, includes a power supply 28 powered by a 9V lithium battery 20, a DC step-up circuit 30, a detection circuit 32, a microcontroller 34, non-volatile, EEPROM memory 40, status indicators 38, and control switches 36. The power supply 28 in this implementation is a National Semiconductor LM2936-5.0 5V regulator. The DC step-up circuit 30 generates a high (51V) voltage that is applied across the fingers 24, 26 of the sensor 14 to break down oxide layers of metallic whiskers that impinge upon the sensor 14.

Figure 5:
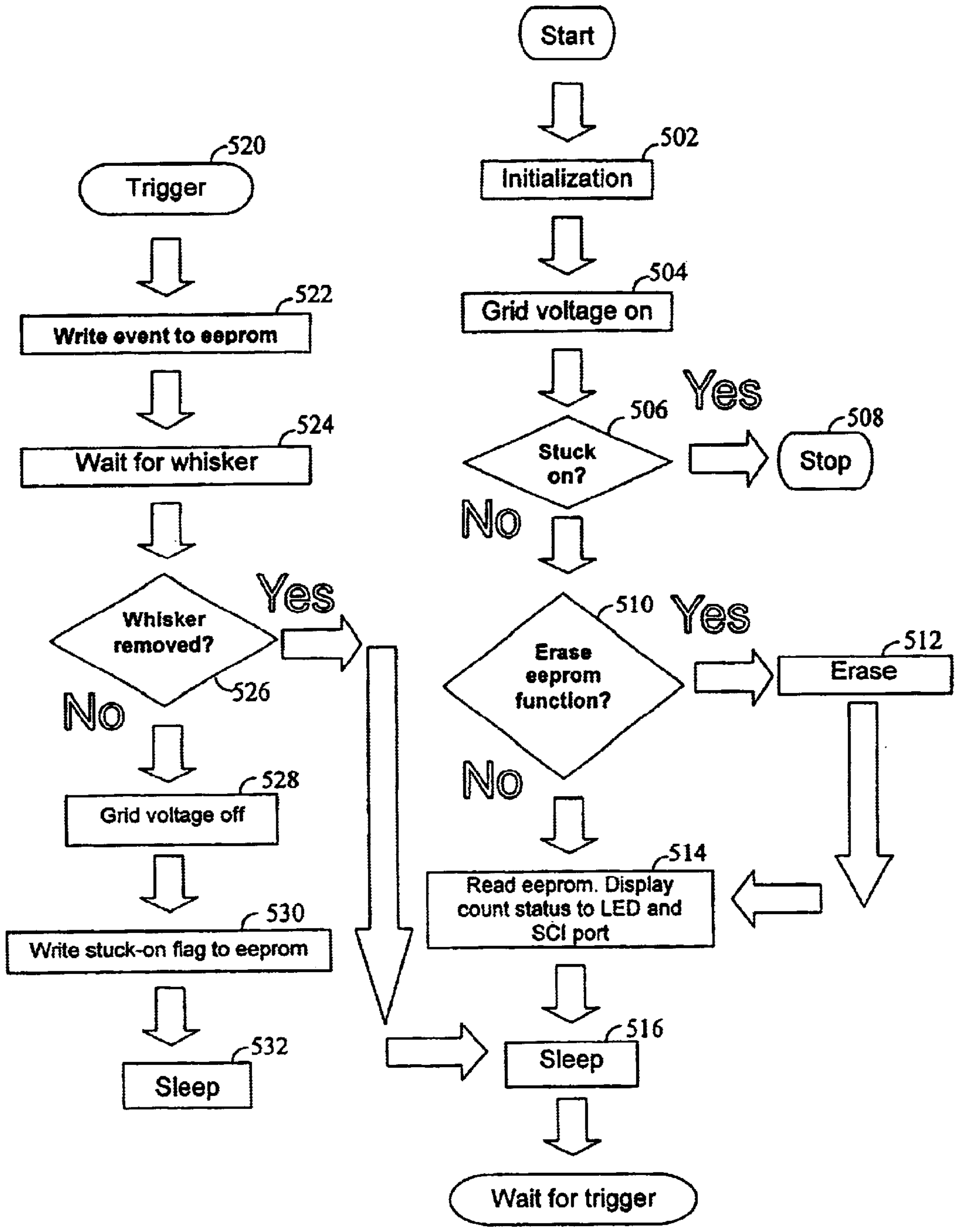
FIG. 5 is a flow diagram showing a preferred embodiment of a particle detection process executed by the detector.

An EPROM-based microcontroller 34, such as the PICmicro PIC16C73B-20, executes a particle detection process, as shown in FIG. 5. This process is implemented as a software program stored in the microcontroller's internal program memory. When the detector 10 is first powered, by inserting the battery 20, or when the microcontroller 34 is reset by pressing a reset switch of the control 36, the microcontroller 34 performs an initialisation step 502, and then switches the grid voltage at step 504. Step 504 is achieved by enabling the output 31 of a DC—DC controller chip, such as the Maxim MAX773, of the DC step-up circuit 30 through an output port 6 of the microcontroller 34.

The microcontroller 34 detects the appearance of a conductive path between opposing fingers 24, 26 of the sensor 14 by sensing a change in the voltage on a single-bit input port 45 (RB7) connected to the sensor 14 via the detection circuit 32, which includes a voltage divider having two resistors 44, 46 in series. Particular resistance and voltage values are described below for one implementation of the detector 10, but it will be understood by those skilled in the art that different values may be selected, particularly if a different microcontroller is used. For example, a microcontroller with an internal voltage comparator may be employed, or a microcontroller that is coupled to an external voltage comparator.

A first resistor 46, of value 62 kΩ, is connected between the input port 45 and ground. A second resistor 44, of value 2 MΩ, is connected between the port 45 and one set of fingers 24 of the detection region 14. These fingers 24 are also connected to the 51V supply 31 from the DC step-up circuit 30 through a current-limiting resistor 42 of value 560 Ω. The other set of fingers 26 is connected to ground. When there is no conductive particle between opposing fingers of the sensor 14, current flows from the 51 V supply to ground through the three resistors. Because the value of the current-limiting resistor 42 is negligible in comparison with the first and second resistors 44, 46, the 51 V supply potential is essentially divided across the first and second resistors, so that the potential at the input port 45 of the microcontroller 34 is at a level other than low, approximated by 51 V (62 kΩ/2MΩ)≈1.6 V. When a conductive particle such as a metallic whisker forms a conductive path between opposing fingers 26 and 26 of the sensor 14, most of the current from the 51 V supply passes through the sensor 14 to ground, provided that the resistance of the conducting path through the particle is substantially less than 2 MΩ. The potential at the input port 45 is therefore a low level, ≈0 V.

After turning the grid voltage on at step 504, a check is performed at step 506 to see if a particle is stuck between opposing fingers 24 and 26 of the sensor 14. If this occurs, the input port voltage will remain at ≈0 V. Normally, the current flowing through the conducting particle will be sufficient to melt the particle and destroy the conducting path. However, if this does not occur, the detector cannot detect any more particles, and the battery power will simply drain away. Consequently, the grid voltage is shut off to save power and the process stops at step 508. Otherwise, the input port potential returns to ≈1.6 V, and the process proceeds to step 510 with a check to see if an erase EEPROM function has been selected by the user controls 36. If so, then the EEPROM memory 40 is erased at step 512. After this step, or if the function was not selected, a detection event count is read from the EEPROM memory 40 and the count value is displayed on the status indicator 38 and output to a serial port of the microcontroller 34 for transfer to an external device such as a notebook computer. The status indicator 38 is a light-emitting diode (LED) that flashes a number of times equal to the count value.

Subsequently, the microcontroller 34 enters a sleep mode at step 516 and waits for a particle to impinge upon the sensor 14. Sleep mode is a low power consumption mode of the microcontroller 34 which conserves battery power. If a particle forms a conducting path between opposing fingers 24 and 26 of the sensor 14, the potential at the input port RB7 of the microcontroller 34 changes from ≈1.6 V to ≈0 V. The input port circuitry of the microcontroller 34 monitors the potential on this port and generates an interrupt when its value differs from a previously latched value. The interrupt wakes the microcontroller 34 from sleep mode at step 520. The detection event is written to the EEPROM memory 40 at step 522 by simply reading the currently stored detection count value, incrementing it by one, and storing the incremented value. The process then delays for a predetermined period of time, for instance 200 ns, at step 524, and then checks to see if the particle has been removed, as described above, at step 526. If the particle has been removed, the process loops back to step 516 and enters sleep mode. If the particle has not been removed, the grid voltage is turned off at step 528, a flag is written to EEPROM memory at step 530, and the process stops at step 532.

Many modifications will be apparent to those skilled in the art without departing from the scope of the present invention as herein described with reference to the accompanying drawings. For example, a more sophisticated display such as a liquid crystal display may be used instead of the status LEDs. More sophisticated communications methods may also be employed; for example, the detector 10 may include a Bluetooth module for wireless communication of particle detection events, event counts, and status information to a remote processing module. The storage of particle detection events may include storing a timestamp with each detection event.

What is claimed is:

1. A device for detecting the presence of in airborne, electrically conductive particle, said device including:

spaced conductors in the form of a coplanar set of interdigitated fingers, forming a planar detection region; and a circuit for detecting when said electrically conductive particle forms a conducting path between said spaced conductors.

2. A device as claimed in claim 1, wherein said circuit establishes a voltage between said conductors to break down an electrically insulating region of said particle.

3. A device as claimed in claim 1, wherein said circuit applies a voltage across said conducting path to destroy said electrically conducting path.

4. A device as claimed in claim 1, wherein said device includes means for indicating the detection of said particle.

5. A device as claimed in claim 1, wherein said circuit, stores event data representing detection events that respectively correspond to detection of each electrically conductive particle by said circuit.

6. A device as claimed in claim 5, wherein said event data includes a count of the number of said detection events.

7. A device as claimed in claim 6, wherein said event data includes a timestamp for each of said detection events.

8. A device as claimed in claim 5, wherein said device includes means for displaying said event data.

9. A device as claimed in claim 5, wherein said device includes means for transmitting said event data to an external device.

10. A device as claimed in claim 5, wherein said device includes means for resetting said event data.

11. A device as claimed in claim 1, wherein said device can be held in a hand of a user of said device.

12. A device as claimed in claim 1, wherein the surface of said conductors comprises a non-oxidizing conductive substance.

13. A device as claimed in claim 1, wherein the spacing between said conductors corresponds to a predetermined minimum size of said particle.

14. A device as claimed in claim 1, wherein said device includes a plurality of said planar detection region.

15. A device as claimed in claim 14, wherein at least two of said region are arranged in substantially orthogonal orientations.

16. A device as claimed in claim 14, wherein said device includes three of said region, where two of said region are arranged to extend substantially perpendicular to the other region.

17. A device as claimed in claim 1, wherein said region includes a plurality of coplanar mutually spaced set of said conductors, such that said particle is detected by said circuit when said particle comes to rest across at least two of the conductors.

18. A device claimed in claim 1, wherein said circuit applies a voltage across said conductors and detects a change in said voltage by the formation of said conducting path by said particle.

19. A device as claimed in claim 18, wherein said voltage is sufficient to destroy said particle when said conducting path is formed.

20. A device as claimed in claim 19, wherein said circuit detects the destruction of said particle by removal of said conducting path.

21. A device as claimed in claim 20, wherein said circuit inhibits the application of said voltage if said destruction has not occurred within a predetermined period of time.

22. A device as claimed in claim 21, wherein said circuit stores a flag if said destruction has not occurred within said predetermined period of time.

23. A device as claimed in claim 22, wherein said circuit enters a power saving mode when waiting to detect said particle or if said destruction has not occurred.

24. A device as claimed in claim 1, wherein said particle is a metallic whisker.

25. A device as claimed in claim 24, wherein said whisker is a zinc whisker.

26. A device as claimed in claim 12, wherein said substance is gold.

27. A device for detecting an electrically conductive whisker, including:

a sensor grid of alternate elongate spaced conductors; and a detection circuit for detecting when said whisker electrically connects said conductors;

wherein said circuit applies a voltage to one set of said conductors sufficient to detect and destroy said whisker when it creates a conductive path to the alternate set of said conductors.

28. A device as claimed in claim 27, wherein said whisker is a zinc whisker.

29. A device as claimed in claim 27, wherein said conductors are gold.

30. A device as claimed in claim 27, wherein said device is hand held.

31. A device as claimed in claim 27, wherein said circuit records a whisker detection event when said circuit detects change in said voltage.

* * * * *